United States Patent [19]
Shime

[11] Patent Number: 5,872,756
[45] Date of Patent: Feb. 16, 1999

[54] COMPACT-DISK PLAYER

[75] Inventor: Isao Shime, Yamagata, Japan

[73] Assignee: NEC Corporation, Tokyo, Japan

[21] Appl. No.: 791,031

[22] Filed: Jan. 29, 1997

[30] Foreign Application Priority Data

Jan. 30, 1996 [JP] Japan .................................. 8-013873

[51] Int. Cl.$^6$ .............................................. G11B 33/02
[52] U.S. Cl. ...................................... 369/77.1; 369/75.2
[58] Field of Search .................................. 369/75.1, 75.2, 369/77.1

[56] References Cited

U.S. PATENT DOCUMENTS

| | | | |
|---|---|---|---|
| 4,507,768 | 3/1985 | Ikedo et al. ............................. | 369/77.1 |
| 4,592,039 | 5/1986 | Toyoguchi et al. ..................... | 369/75.2 |
| 4,628,498 | 12/1986 | Takamatsu et al. .................... | 369/77.1 |
| 4,995,027 | 2/1991 | Aoyagi et al. .......................... | 369/77.1 |
| 5,084,855 | 1/1992 | Kobayashi et al. .................... | 369/75.2 |
| 5,260,925 | 11/1993 | Camps et al. .......................... | 369/77.1 |

FOREIGN PATENT DOCUMENTS 58-224468  12/1983  Japan.
60-192194  12/1985  Japan.

Primary Examiner—Stuart S. Levy
Assistant Examiner—William J. Klimowicz
Attorney, Agent, or Firm—Sughrue, Mion, Zinn, Macpeak & Seas, PLLC

[57] ABSTRACT

A CD-ROM disk player has a guide member and a pair of rollers for shifting a CD-ROM disk into or out of a disk slot of the player. The guide member has a pair of guide portions and a bridge portion connecting the guide portions to define the operating position for the disk. One of the guide portions has a curved protrusion for stopping the disk in the direction of shift of the disk for preventing the disk from falling. The CD-ROM player can be operated in upright or laid down posture.

5 Claims, 3 Drawing Sheets

COMPACT-DISK PLAYER

BACKGROUND OF THE INVENTION (a) Field of the Invention:

The present invention relates to a compact-disk (CD) player and, more particularly, to an improvement of a loading mechanism of a CD player for use in a personal computer.

(b) Description of the Related Art:

A conventional CD player such as a CD-ROM (read-only-memory) player, as shown in FIGS. 1A and 1B, has a disk holder or tray 27 which can be pulled out from a disk slot formed in the front panel 14 of a player body or computer body 11 for loading a CD-ROM 12. FIG. 1A shows the CD-ROM player in the pulled-out state of the disk holder 27 while FIG. 1B shows the same in the retracted state of the disk holder 27 wherein the disk slot is closed by a lid 28.

After the disk holder 27 is pulled out from the disk slot, a disk 12 is mounted on the disk holder 27, which is then retracted from the disk slot. In the retracted state of the disk holder 27 with the mounted disk 12, information recorded on the disk 12 is reproduced. In general, the CD-ROM player of this type cannot be used in the upright posture of the disk 12.

Another conventional CD-ROM player, as shown in FIGS. 2A and 2B, has a pair of guide members 29a and 29b for shifting a disk 12 into or out of the disk slot formed in the front panel 14 of a computer body 11. FIGS. 2A and 2B show the CD-ROM player in the pulled-out state and the retracted state, respectively, of the guide members 29a and 29b.

The guide members 29a and 29b have respective guide grooves for holding therein peripheral edge portions of the disk 12 which is inserted to the grooves in the direction normal to the front surface 14 of the computer body 11. The disk 12 is carried by the guide members 29a and 29b into the operating position for the disk 12 to reproduce the information from the disk 12. When the CD-ROM player is reproducing information from the disk 12, the disk slot formed in the front panel 14 of the computer 11 body is closed by a lid 28, as shown in FIG. 2B.

The CD-ROM of FIGS. 2A and 2B has an advantage that it can be used in either upright or laid-down posture of the disk 12, i.e., of the computer body 11. In this configuration, however, a large space must be secured for inserting the disk from the front. In particular, the space between the computer body 11 and a key board (not shown) may limit the arrangement of the computer system. Further, the insertion of the disk 12 into the small width grooves of the guide members 29a and 29b is not easy.

SUMMARY OF THE INVENTION

It is an object of the present invention to provide a new configuration of a loading mechanism of a disk player such as a CD-ROM player.

It is an additional object of the present invention to provide a disk player capable of operating in either upright or laid-down posture of a disk, substantially without increasing the space for loading or unloading of the disk.

In accordance with the present invention, there is provided a compact-disk player comprising a player body, a disk slot formed in the body for receiving an information storage disk, a pair of rollers, rotatably mounted by the player body, for sandwiching the disk to shift the disk into or out of the disk slot by rotation of the rollers.

In accordance with a preferred embodiment of the present invention, the disk player further has a guide member, interposed between the pair of rollers, for slidably guiding the disk at the peripheral edge of the disk. The guide member preferably has a protrusion at a front portion of the guide member for stopping the disk in the direction of shift of the disk to prevent the disk from falling from the guide member.

A disk loading mechanism by using a pair of rollers for shifting the disk is not known in the CD player. The loading mechanism using the pair of rollers enables the disk player to be placed upright or laid-down if used together with the guide member as described above.

The above and other objects, features and advantages of the present invention will be more apparent from the following description, referring to the accompanying drawings, in which similar elements are designated by the same reference numerals throughout the drawings.

DESCRIPTION OF THE PREFERRED EMBODIMENTS

Figure 1A:
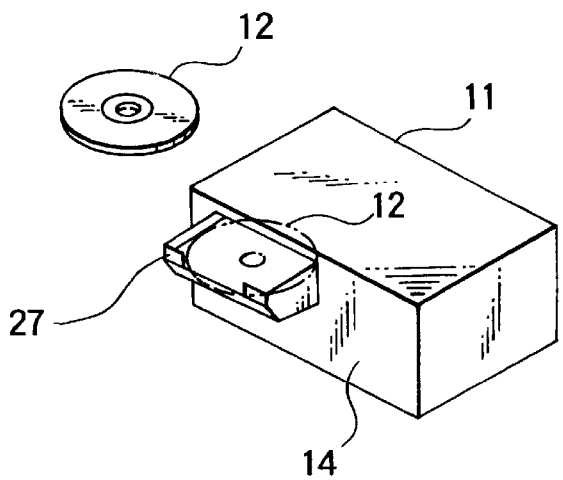
FIGS. 1A and 1B are perspective views of a conventional CD-ROM player mounted on a personal computer in a pulled-out state and a retracted state of the disk holder, respectively.
Figure 1B:
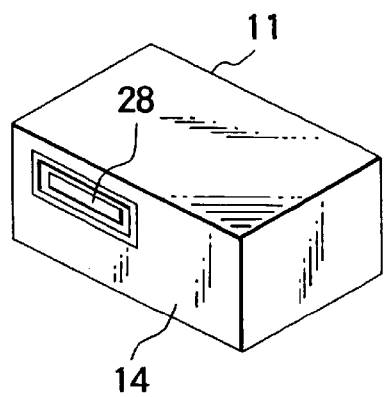
Figure 2A:
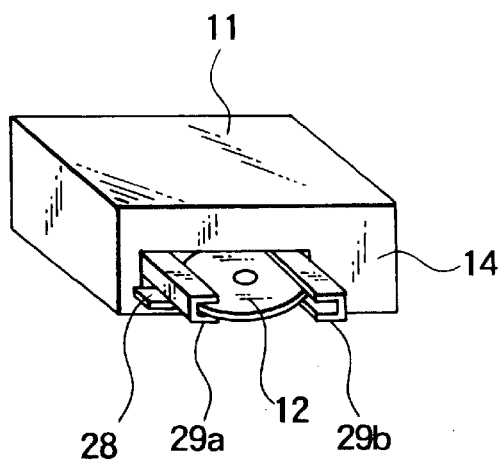
FIGS. 2A and 2B are perspective views of another conventional CD-ROM player mounted on a personal computer in a pulled-out state and a retracted state of the guide members, respectively.
Figure 2B:
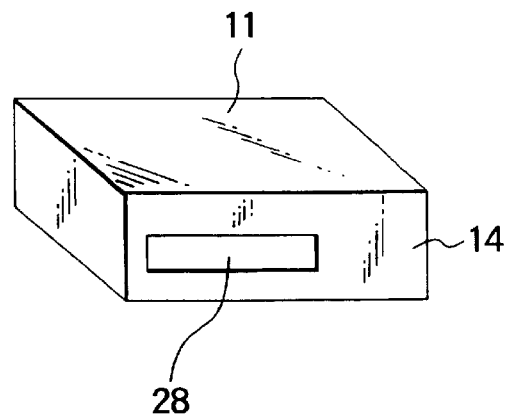
Figure 3:
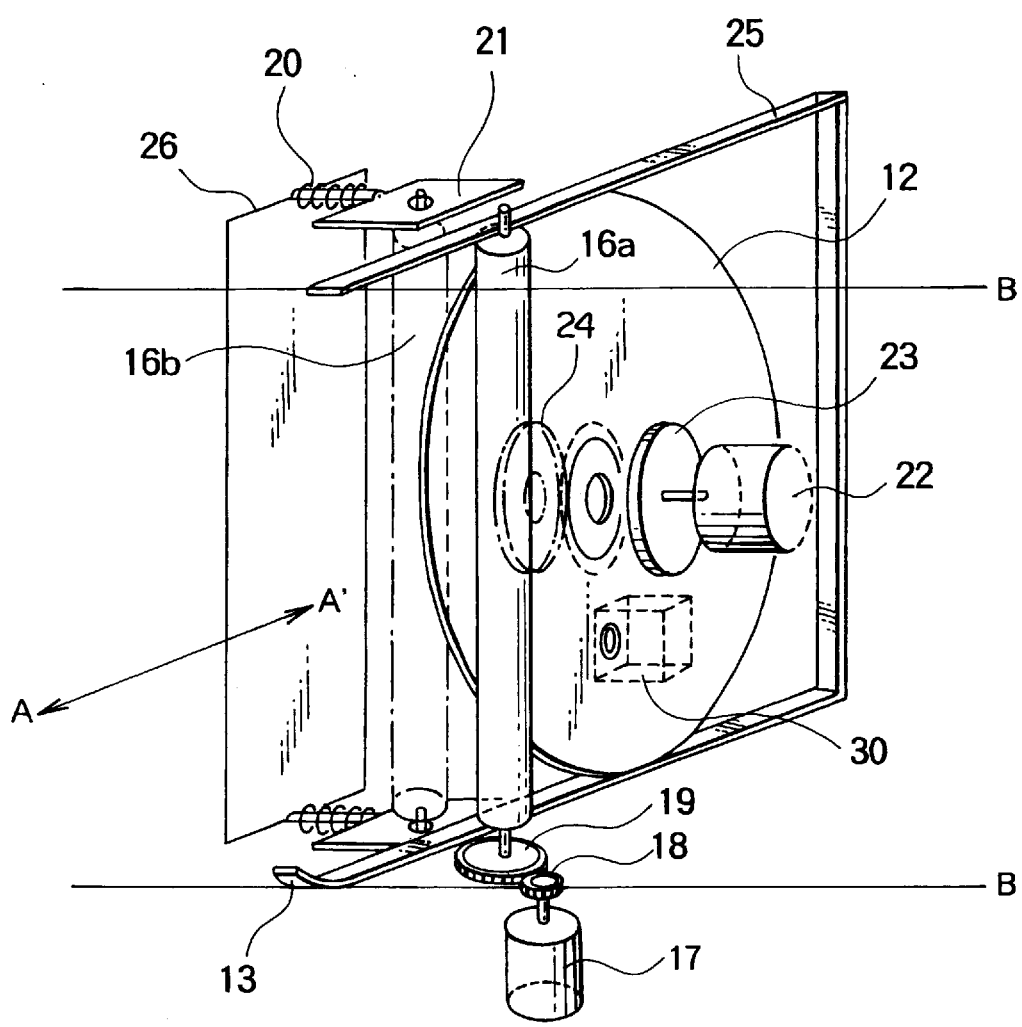
FIG. 3 is a partial perspective view of a CD-ROM player according to a first embodiment of the present invention.

Referring to FIG. 3, there is shown a CD player (CD-ROM player) according to an embodiment of the present invention, which is exemplarily placed for holding a CD-ROM (disk) 12 in its vertical posture. The disk player has a loading mechanism including a guide member 25, made of a flat bar having a top guide portion, a bottom guide portion and a vertical bridge portion connecting the top guide portion and the bottom guide portion. The guide member 25 in this embodiment is fixed to the player body or computer body.

The guide member 25 has a width and a size equivalent to the thickness and diameter of the disk 12 so that the disk 12 can be positioned between the top guide portion and bottom guide portion of the guide member 25, as shown in FIG. 3. The tip of the bottom guide portion of the guide member 25 has a protrusion protruding from the tip of the top portion of the guide member 25, as shown by the lines B which are aligned vertically.

A pair of rollers 16a and 16b are arranged such that the pair of rollers 16a and 16b sandwich the guide member 25 therebetween. The pair of rollers 16a and 16b are driven for rotation by a roller motor 17, by way of a gear assembly including a driving gear 18 and a wheel gear 19, for shifting the disk 12 in the direction normal to the front panel of the computer body, the direction being shown by arrows A—A in FIG. 3.

A pair of support members 21 for rotatably supporting the central axis of the roller 16b is attached to a stationary member 26 of the player body by way of a spring member 20 which urges the roller 16b toward the roller 16a for forcing the disk 12 to shift in the direction A—A during rotation of the rollers 16a and 16b. The curved protrusion 13 of the guide member 25 protrudes from the bottom portion of the guide member 25 in the direction of arrow A and is then curved toward the center of the disk slot. The curved protrusion 13 is provided for preventing the disk 12 from being ejected in the direction toward A to fall from the guide member 25. The curved protrusion 13 protrudes from the front panel 14 of the computer body 11 in a minimum amount sufficient for protecting the disk 12 against falling from the guide member 25.

A clamping member 24 is positioned opposite to the central hole or sprocket hole of the disk 12 in operation for securing the disk 12 between the clamping member 24 and a spindle member 23 at the operating position of the player. The spindle member 23 is attached to the axis of a spindle motor 22 for rotation. A pick-up 30 is provided near the disk surface for reproducing information from the disk 12. Although the CD-ROM player shown in FIG. 3 has no housing, the CD-ROM player may have a housing for protecting the disk if the player is separated from the computer body.

Figure 4A:
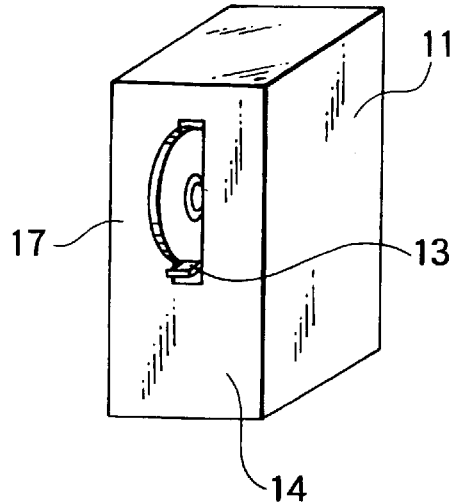
FIGS. 4A and 4B are perspective views of the CD-ROM player of FIGS. 3A and 3B in the pulled-out state and retracted state of the disk.
Figure 4B:
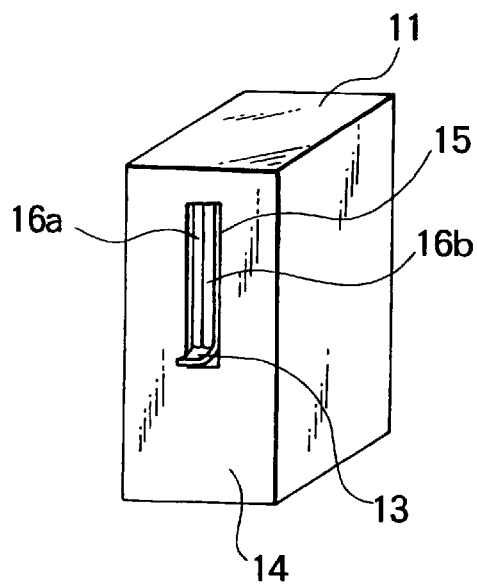

FIGS. 4A and 4B show the CD-ROM player of FIG. 3 mounted on a computer body 11 in the state of loading or unloading of a disk 12 and in the state of reproduction from a disk, respectively. The computer body 11 has a disk slot 15 in the front panel 14 of the computer body 11 for introducing a disk into the computer body 11. After the disk 12 reaches the operating position of the player, the rollers 16a and 16b are in contact with each other for closing the disk slot 15, as shown in FIG. 4B.

In operation, when the disk 12 is introduced from the disk slot, the pair of rollers 16a and 16b, as shown in FIG. 3, sandwich the disk 12 for shifting the same along the guide member 25 by rotation of the roller motor 17. After the disk 12 reaches the operating position of the player, the clamping member 24 is moved toward the disk surface for clamping the disk 12 between the clamping member 24 and the spindle member 23. Subsequently, the clamping member 24 and the spindle member 23 together with the spindle motor 22 are shifted in the direction parallel to the disk surface so that the disk 12 is placed out of contact with the guide member 25 for rotation.

After the disk 12 is started for rotation, the pick-up 30 is moved into its operating position to reproduce information from the disk 12. Since the shifting mechanism for the pick-up 30 is well known in the art, the shifting mechanism is not shown in FIG. 3 for simplification.

The unloading operation of the disk 12 is effected in a procedure which is reverse to the procedure as described above. After the central hole of the disk 12 comes out from the computer body 11, as shown in FIG. 4A, the pair of rollers 16a and 16b are stopped in rotation. The curved protrusion 13 holds the disk in the direction A—A between the top portion and bottom portion of the guide member 25. Since the central hole of the disk 12 appears from the front panel 14, the disk 12 can be taken out by hand at the central hole without staining the disk surface with fingerprint etc. The operation for the loading and unloading of the disk is similarly effected in the case where the CD-ROM player and the computer body are laid down for reproducing information from the disk in the horizontal posture of the disk, provided that some modification is provided to the configuration of the guide member 25.

Figure 5:
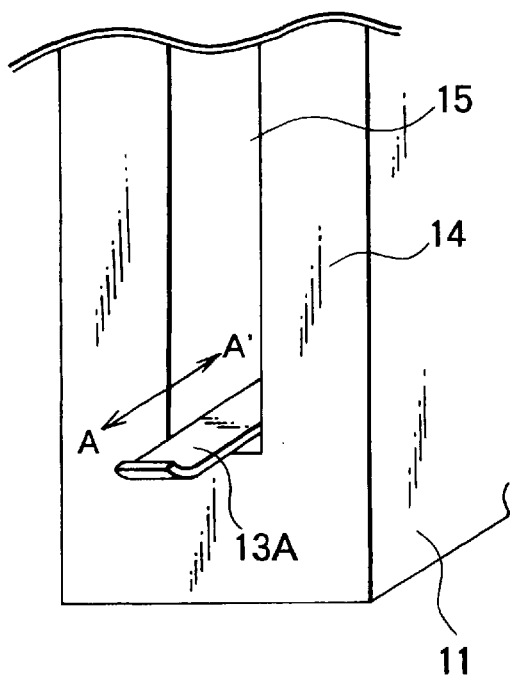
FIG. 5 is a partial perspective view of a modified embodiment of the CD-ROM player of FIG. 3.

FIG. 5 shows a modified embodiment of the present invention, wherein the curved protrusion 13A can be retraced from the disk slot 15 of the front panel 14 during the reproduction by the CD-ROM player, whereas the curved protrusion of FIG. 3 is not retraced during the reproduction. The curved protrusion 13A together with the guide member is only slightly shifted in the direction A—A. When the disk is to be introduced from the disk slot or the disk appears from the disk slot, the curved protrusion 13A is pulled out for loading or unloading of the disk, thereby preventing the disk from falling. The curved protrusion 13A is pulled out before rotation of the rollers for unloading of the disk. In this modification, the space in front of the computer body 11 required for the CD-ROM player can be further reduced.

Figure 6:
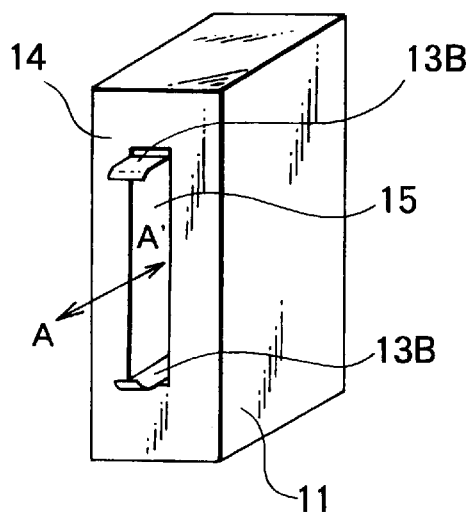
FIG. 6 is a perspective view of a modified embodiment of the CD-ROM player of FIG. 3.

FIG. 6 shows another modified embodiment of the CD-ROM player, wherein a pair of curved protrusions 13B are provided for the CD-ROM player, thereby enabling placement of the CD-ROM player or computer body 11 upside-down. The pair of protrusions 13B are made of resilient materials so that the disk can be removed in the direction A—A.

Although the present invention is described with reference to preferred embodiments thereof, the present invention is not limited thereto and various modifications or alterations can be easily made from the embodiments by those skilled in the art without departing from the scope of the present invention as set forth in the appended claims.

What is claimed is:

1. A disk player comprising:
    a player body;
    a disk slot formed in said player body for receiving an information storage disk;
    a pair of rollers disposed proximate to the disk slot and rotatably mounted by said player body, for sandwiching a leading edge of the disk upon insertion thereof into the disk slot to shift the disk into or out of said player body by rotation of said rollers; and
    a guide member, interposed between said pair of rollers, for slidably guiding the disk at diametrically opposite edges of the disk;
    wherein said guide member has at least one protrusion at a front portion of said guide member for stopping the disk in the direction of ejection of the disk.

2. A disk player as defined in claim 1, wherein said protrusion is curved toward the center of the disk slot while enabling the disk to be unloaded.

3. A disk player as defined in claim 1, wherein said protrusion is retracted during reproduction of the disk.

4. A disk player as defined in claim 1, wherein said guide member includes a pair of protrusions at front portions of said guide member.

5. A disk player comprising:
    a player body;
    a disk slot formed in said player body for receiving an information storage disk;
    a pair of rollers disposed proximate to the disk slot and rotatably mounted by said player body, for sandwiching a leading edge of the disk upon insertion thereof into the disk slot to shift the disk into or out of said player body by rotation of said rollers; and
    a guide member, interposed between said pair of rollers, for slidably guiding the disk at diametrically opposite edges of the disk;
    wherein said guide member includes a pair of guide portions disposed opposite to each other and a bridge portion connecting said guide portions;
    wherein one of said guide portions has a protrusion for stopping the disk in the direction of ejection of the disk.

* * * * *